UNITED STATES PATENT OFFICE.

GEORG HEINRICH WEISS, OF CHARLOTTENBURG, GERMANY.

CARBONYL METADIAMIDO SALICYLIC ACID.

SPECIFICATION forming part of Letters Patent No. 580,744, dated April 13, 1897.

Application filed April 13, 1896. Serial No. 587,280. (Specimens.)

*To all whom it may concern:*

Be it known that I, GEORG HEINRICH WEISS, residing at Charlottenburg, near Berlin, in the Kingdom of Prussia and Empire of Germany, have invented a new and useful Improvement in the Manufacture of a New Color-Producing Aromatic Amin, consisting, essentially, in the preparation and utilization of carbonyl metadiamido salicylic acid, of which the following is a full, true, and exact specification.

By the action of phosgene upon a solution kept alkaline of orthoamidophenol, carbonyl amidophenol, or orthoöxycarbanil is obtained a body (as shown by Chetmicki B. XX 177) of the constitution of

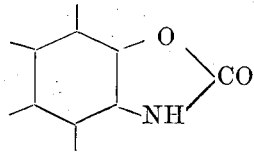

and having the melting-point 141° to 142°, equal molecules of both substances combining under separation of hydrochloric acid. The body exhibits the properties of a ketone, for it forms a hydrazone with phenylhydrazin.

The base of the present application, carbonyl metadiamido salicylic acid, represents a derivative of this substance.

According to its formation it can only have the constitution

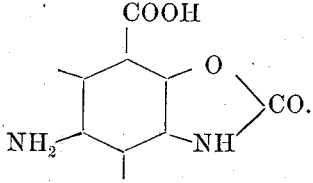

In consequence of the presence of a salt-forming group equaling COOH and a carbonyl group CO the azo dyestuffs produced with this base show quite a remarkable affinity for metallic mordants, with which they form excellent fast lakes. They surpass in many respects the azo dyestuffs dyeing on mordants known hitherto.

Ten kilograms of the well-crystallizing nitroamido salicylic acid, preferably prepared by the partial reduction of dinitro salicylic acid with sulfureted ammonia, (see Beilstein, *Handbook of Organic Chemistry*, third edition, Vol. II, p. 1510,) are dissolved together with five kilograms of caustic soda in one hundred and fifty kilograms of water. A current of carbonyl chlorid phosgene is then passed through the cold solution—care to be taken lest the temperature rise above 30° to 35° centigrade—until a sample of the crystalline sediment, which is precipitated from the reddish-brown solution in proportion as the reaction goes on, treated with sodium nitrite and muriatic acid, does not show a dark cardinal-red color when brought together with an alkaline solution of beta-naphthol disulfonic acid R, this being a sure proof that there is no more free nitroamido compound present.

The crystalline precipitate is filtered off and purified by crystallization from boiling water, in which it is easily soluble.

The thus-purified body carbonyl metanitroamido salicylic acid forms dirty white to brownish needles, easily soluble in hot water and alcohol, insoluble in benzene. The ammonia-soda and potash-salts, crystallizing in small orange laminæ, are easily soluble in water with a reddish-brown color. Heated above 100° centigrade it loses water of crystallization. It melts at 263° centigrade. It differs from nitroamido salicylic acid by its insolubility in hydrochloric acid. It is finally transformed into a base by reduction, which necessitates about 4.23 kilograms of the nitro body, about eight kilograms of tin, and about sixteen kilograms of hydrochloric acid. To the nitro body is first added about sixteen kilograms of hot water and half the quantity of hydrochloric acid, together with some tin, when a violent reaction takes place. The remaining tin and hydrochloric acid are then alternately added in small portions, thus keeping the reaction going energetically. The tin is finally removed by hydrogen sulfid or by precipitation with soda, and the amido body is separated from the filtrate with acetate of sodium or with acetic acid, (from the soda-alkaline filtrate.) It crystallizes in white needles, assuming a reddish tint when exposed to air, very little soluble in hot water and alcohol, insoluble in benzene, ligroine, and chloroform, loses water of crystallization on heating above 100° centigrade, and melts at 252° centigrade. Containing both carbonyl and amido groups, it forms two kinds of salts—viz., with acids and alkalies. They all crystallize very well, are readily soluble in water, and their aqueous solutions show a pretty bluish fluorescence. The thus-obtained carbonyl metadiamido salicylic acid is easily diazotizable, the diazo compound forming, by combination with the usual color-producing substances, azo dyestuffs which are easily mordanted.

Interesting properties are possessed by those dyestuffs which are obtained by combining the base with alpha-naphtylamin or its one-sixth and one-seventh sulfonic acid and further diazotizing the thus-produced amidoazo compound and combining with naphthol-dioxynaphthalene and amidonaphthol mono and di sulfonic acids. They form black-chrome mordanted wool dyestuffs exceedingly fast to light, milling, and soap.

What I claim as my invention is—

1. The herein-described method for the manufacture of carbonyl metadiamido salicylic acid, which consists in treating nitroamido salicylic acid with phosgene, thereby producing carbonyl metanitroamido salicylic acid having a melting-point of approximately 263° centigrade, and finally reducing said product to carbonyl metadiamido salicylic acid, substantially as specified.

2. As a new product the carbonyl metadiamido salicylic acid crystallizing in white laminæ of the melting-point 252° centigrade, soluble with difficulty in water and alcohol, insoluble in benzene, ligroine and chloroform, easily diazotizable, the diazo compound forming, by combination with the usual color-producing substances, azo dyestuffs which are easily mordanted, substantially as described.

In testimony that I claim the foregoing as my invention I have signed my name, in presence of two witnesses, this 28th day of March, 1896.

GEORG HEINRICH WEISS.

Witnesses:
O. KNÖFLER,
R. HÖRNBEY.